Nov. 13, 1973  V. D. AFTANDILIAN  3,772,426
SALTS OF THE $B_{11}H_{14}^-$ ANION
Filed May 20, 1969  3 Sheets-Sheet 1

INVENTOR
VICTOR D. AFTANDILIAN,
BY
AGENT

INVENTOR
VICTOR D. AFTANDILIAN

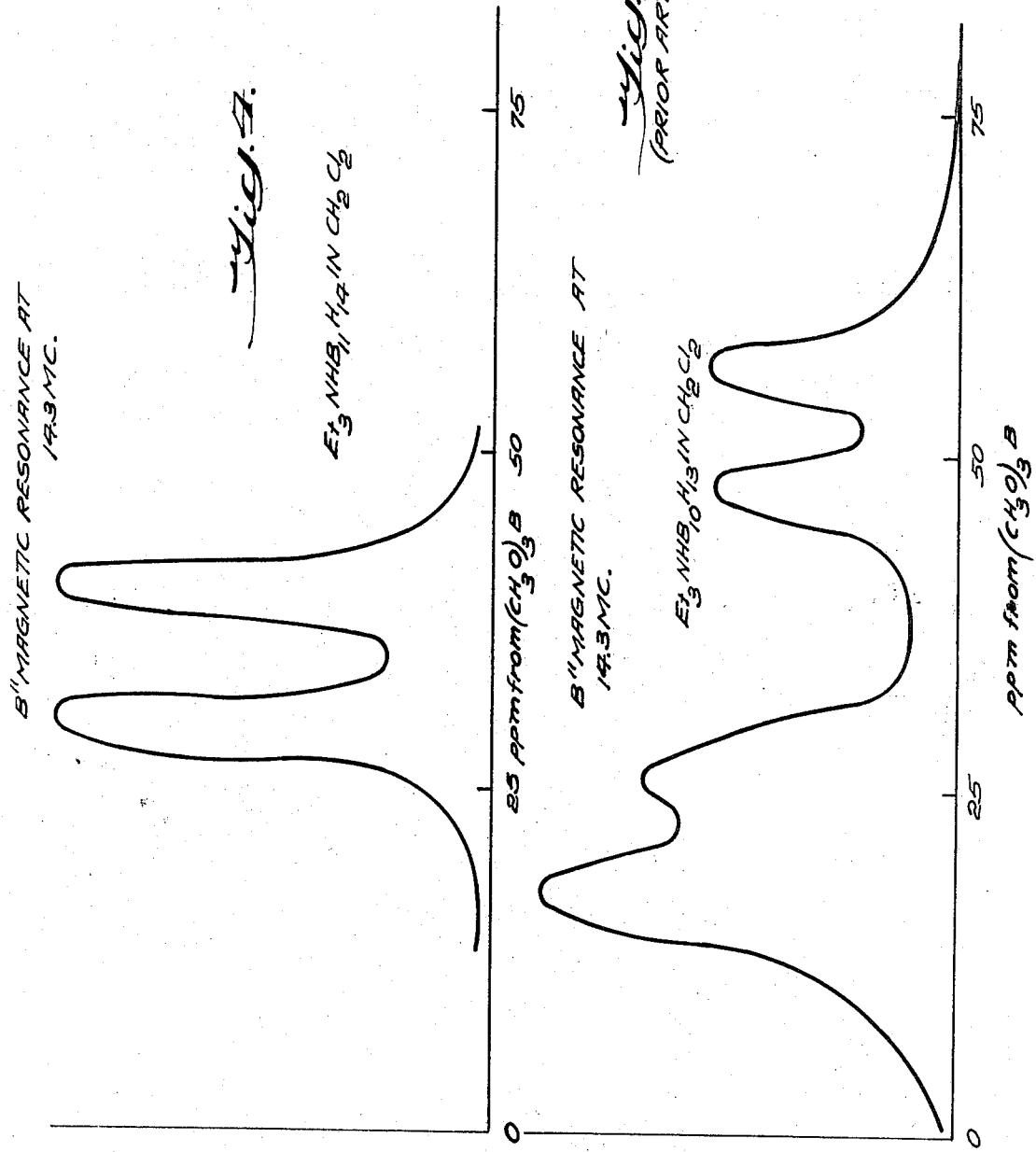

United States Patent Office 3,772,426
Patented Nov. 13, 1973

3,772,426
SALTS OF THE $B_{11}H_{14}^-$ ANION
Victor D. Aftandilian, Weston, Mass., assignor to E. I. du Pont de Nemours and Company, Wilmington, Del.
Continuation-in-part of abandoned application Ser. No. 20,835, Apr. 8, 1960, and a division of application Ser. No. 245,463, Dec. 18, 1962, now Patent No. 3,458,531, dated July 29, 1969. This application May 20, 1969, Ser. No. 826,184
Int. Cl. C01b 6/14, 35/00; C07f 5/02
U.S. Cl. 423—286                  5 Claims

ABSTRACT OF THE DISCLOSURE

Metal salts of the $B_{11}H_{14}^-$ anion formed by reacting decaborane with a metal borotetrahydride at temperatures of at least 45° C. and ammonium salts of the $B_{11}H_{14}^-$ anion formed by the metathetical reaction of metal $B_{11}H_{14}^-$ salts with the appropriate ammonium salts. The $B_{11}H_{14}^-$ salts of this invention are useful as components of high energy fuels.

CROSS-REFERENCE TO RELATED APPLICATIONS

Figure 1:
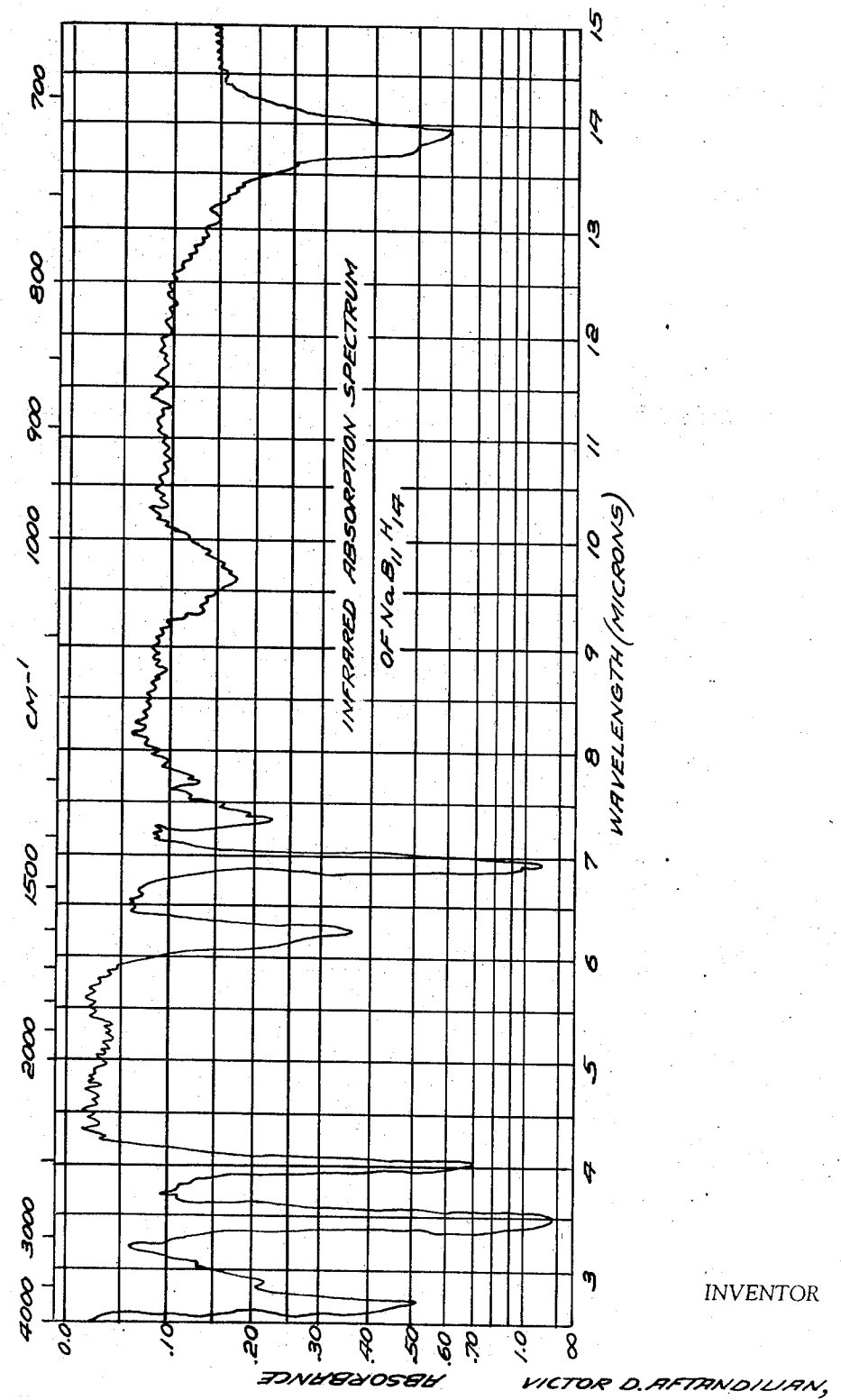

This application is a continuation-in-part of my application, Ser. No. 20,835, filed Apr. 8, 1960, now abandoned, and a division of my copending application, Ser. No. 245,463, filed Dec. 18, 1962, issued as U.S. Pat. 3,458,531 on July 29, 1969.

This invention relates to ionic boron compounds. More particularly, it relates to novel boron hydride salts and to methods for their preparation.

Boron compounds are becoming of increasing value in various applications such as high energy fuels and reducing agents. It is therefore a desirable goal to provide new boron compounds which are especially useful in these and other applications.

The present invention provides a novel group of salts of the boron hydride anion $B_{11}H_{14}^-$. The salts of this invention have the general formula (1)         $M(B_{11}H_{14})_n$ wherein M is a cation selected from the group consisting of metals having a standard oxidation potential of at least 0.5 volt and an atomic number less than 57, ammonium radicals of the formulas $R_2H_2N^+$, $R_3HN^+$, $R_4N^+$, sulfonium radicals of the formula $R_3S^+$, and phosphonium radicals of the formula $R_4P^+$, R is selected from the group consisting of alkyl radicals, and n, the valence of the radical M, is an integer greater than 0 and less than 5, i.e., 1, 2, 3, or 4. The oxidation potentials referred to herein are those listed on p. 1733 of "Handbook of Chemistry and Physics," 41st ed., Chemical Rubber Publishing Co. (1959).

The alkali and alkaline earth metals, i.e., the elements of Groups I–A and II–A, respectively, of the Periodic Table having atomic numbers between 3 and 56, inclusive, include lithium, sodium, potassium, rubidium, cesium, beryllium, magnesium, calcium, strontium, and barium. These form a preferred group of metal cations in the salts of this invention. Other cations of metals having standard oxidation potentials of at least 0.5 and atomic numbers less than 57 include scandium, aluminum, titanium, zirconium, manganese, vanadium, niobium, zinc, chromium, and gallium. The R's in the above formulas for the ammonium, sulfonium and phosphonium compounds can be either the same or different and preferably contain up to 18 carbons each. It will be appreciated that when M in the above formula is an alkali metal or an ammonium, sulfonium or phosphonium radical, n is 1; when M is an alkaline earth metal, n is 2; and when M is another metal of the above-defined type, n can be 2, 3 or 4.

The salts of this invention are soluble in water with slow decomposition in such solutions. Some of the salts are also soluble in ethers, but all are insoluble in hydrocarbons. Both the aqueous and ethereal solutions of the salts are very strong reducing media, e.g., they are capable of reducing silver and nickel salts to the corresponding free metals. These salts of the $B_{11}H_{14}^-$ anion are also hypergolic with nitric acid, i.e., they are ignited by contact with concentrated nitric acid.

The alkali and alkaline earth metal salts of this invention can be prepared by the reaction of decaborane with an alkali metal or alkaline earth metal borohydride in an ether. The reaction is illustrated by the following equation:

(2)     $M'(BH_4)_n + nB_{10}H_{14} \rightarrow M'(B_{11}H_{14})_n + 2nH_2$

In this equation the symbol M' represents an alkali or alkaline earth metal of valence n. When M' is an alkali metal, n is 1, and when M' is an alkaline earth metal, n is 2.

From Equation 2 the stoichiometric proportions of decaborane and metal borohydride required in this reaction are one mole of decaborane for each $BH_4^-$ ion in the metal borohydride. Thus, one mole of alkali metal borohydride is required for each mole of decaborane and one mole of alkaline earth metal borohydride is required for every two moles of decaborane.

The ether employed as a reaction medium in this process of making metal salts of the invention can be any organic compound which contains at least one

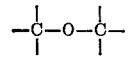

moiety and is inert towards reactants and reaction products. One useful class of ethers thus comprises those compounds in which two identical or different hydrocarbon radicals are joined by an atom of oxygen. Examples of specific operable ethers include alkyl ethers, e.g., diethyl ether, methyl ethyl ether, di-n-butyl ether; cyclic ethers, e.g., tetrahydrofuran and dioxane; ethylene glycol ethers, e.g., ethylene glycol dimethyl ether (glyme), diethylene glycol dimethyl ether (diglyme) and triethylene glycol dimethyl ether (triglyme). Best results are obtained when dioxane, glyme or diglyme are used as the reaction medium; consequently, these are the preferred reaction media. The amount of ether employed should be at least an amount equal to the total weight of the reactants. Proportions of ether reaction medium ranging from 10 to 40 times the total weight of the reactants give very good results.

Reaction temperatures of at least about 45° C. are used in this process. Metal salts of the $B_{11}H_{14}^-$ anion are not obtained at temperatures of 25° C. or lower. The critical nature of the minimum operating temperature of 45° C. is shown by the fact that $NaB_{10}H_{13}$ is the only salt formed when the reaction of sodium borohydride with decaborane in an ether is carried out at 25° C. or lower (see U.S. Pat. 2,993,751 and Hawthorne et al., J. Am. Chem. Soc., 82, 1825 (1960)). However, when the $NaB_{10}H_{13}$ salt obtained at 25° C. is heated with diborane at 45° C. in the presence of an ether $NaB_{11}H_{14}$ is formed. Reaction temperatures ranging from 45° C. up to, say, about 100° C. are generally operable. Preferably, the reaction is carried out at temperatures between 65° and 100° C. It is convenient to use a temperature at which the ether reaction medium boils at atmospheric pressures.

The pressures under which the reaction is carried out are not critical. Subatmospheric, atmospheric, and superatmospheric pressures are all operable. When low-boiling ethers are employed, it is convenient to use a closed reaction vessel and the autogenous pressure developed by the reaction system at a reaction temperature. When an ether boiling between 65° and 100° C. is employed, it is convenient to carry out the reaction under reflux conditions at atmospheric pressure. Similarly, when high boiling ethers are employed, it is often convenient to use subatmospheric reaction pressures.

The reaction between the metal borohydride and the decarborane is continued until evolution of hydrogen ceases. Several hours are generally required to complete a reaction. The exact time depends mainly on the particular metal borohydride used, the particular ether, and the particular reaction temperature being employed. With lithium and sodium borohydrides and reaction media such as dioxane or glyme, reaction temperatures of 90–100° C. require 10–16 hours for completion of the reaction.

The metal salts of the $B_{11}H_{14}^-$ anion can be isolated by various methods. The salts prepared as described above are normally obtained in the form of their etherates in which the metal salt is combined with several molecules of ether of crystallization. When the reaction is carried out in dioxane, the reaction product is a solid dioxanate which can be filtered from the reaction medium and dried at ordinary or moderately elevated temperatures, e.g., temperatures up to 100° C. and preferably under reduced pressure, e.g., pressures as low as a few millimeters of mercury. When ethers other than dioxane are employed as reaction media, the salts obtained are in the form of oils and the salts can be precipitated as the dioxanates by the addition of dioxane to the crude reaction mixtures or to reaction mixtures which have been concentrated by evaporation of excess solvent. The precipitate dioxanate is then filtered and dried as described previously.

Dioxane-free salts of $B_{11}H_{14}^-$ can be prepared by dissolving the dioxanate of the $B_{11}H_{14}^-$ salt in from two to ten times its weight of water and then evaporating the resulting solution. It is convenient to carry out the evaporation under reduced pressure at slightly above room temperature (e.g., 40° C.). This removes the dioxane and leaves an aqueous solution of the $B_{11}H_{14}^-$ salt, e.g., $NaB_{11}H_{14}$, free of dioxane as shown by infrared analysis. Evaporation of this solution to dryness yields a solid hydrate of $NaB_{11}H_{14}$. This hydrate can then be dehydrated by conventional means.

Dioxane-free metal salts of $B_{11}H_{14}^-$ can also be prepared by other means. For example, addition of one equivalent of aqueous lithium hydroxide to

$(CH_3)_3NHB_{11}H_{14}$, followed by evaporation of the resulting solution to dryness, gives $LiB_{11}H_{14}$. Another way of obtaining sodium or lithium salts of $B_{11}H_{14}^-$ free of ether of crystallization involves passing an aqueous solution of $CsB_{11}H_{14}$ through a column of a strong acid ion exchange resin such as that known commercially as "Amberlite" IR 140, sodium form, to give an aqueous solution of $NaB_{11}H_{14}$. This aqueous solution can then be evaporated to dryness leaving a solid hydrate of $NaB_{11}H_{14}$. Other forms of the "Amberlite" IR 140 will yield other salts of $B_{11}H_{14}^-$.

The ammonium, sulfonium, and phosphonium salts and some of the metal salts of the $B_{11}H_{14}^-$ anion of this invention can be prepared by adding to a first aqueous solution of a soluble salt of a metal or an ammonium, sulfonium, or phosphonium radical with a non-oxidizing anion other than the $B_{11}H_{14}^-$ anion, a second aqueous solution containing a $B_{11}H_{14}^-$ salt of a metal other than that in the first solution, the particular metals being chosen so that the desired salt of the $B_{11}H_{14}^-$ anion is relatively insoluble in water compared with starting salt reactants and other reaction products. When aqueous solutions of tetraethylammonium chloride, triethylsulfonium iodide, tributylphosphonium iodide, or cesium chloride, are mixed with aqueous solutions of $NaB_{11}H_{14}$, the less soluble tetramethylammonium, triethylsulfonium, tributylphosphonium, and cesium salts of the $B_{11}H_{14}^-$ anion precipitate from the reaction mixtures. In some cases it is desirable to cool the reaction mixture to complete precipitation of the desired salt. The precipitated salts obtained in this manner do not contain ether of solvation and can be isolated by filtration followed by washing with small amounts of water and drying at moderately elevated temperatures under reduced pressure.

Water-soluble salts of the $B_{11}H_{14}^-$ anion are also prepared by a metathetical reaction. Addition of a sulfate of a desired cation M, e.g., aluminum, to an aqueous solution of $Ba(B_{11}H_{14})_2$ causes precipitation of insoluble barium sulfate leaving an aqueous solution of the desired salt of the $B_{11}H_{14}^-$ anion, e.g., the aluminum salt. The barium sulfate is removed by filtration and the filtrate is evaporated to leave the desired salt, e.g., $Al(B_{11}H_{14})_3$. Di- and trivalent metal salts of the $B_{11}H_{14}^-$ are often isolated as their hydrates. In some cases the water of hydration can be removed by heating under reduced pressure.

The products and processes of this invention are illustrated in further detail in the following:

EMBODIMENTS OF THE INVENTION

Example 1

(A) Preparation of $NaB_{11}H_{14} \cdot 2.5C_4H_8O_2$.—A sample of 0.95 g. of sodium borohydride (0.025 mole) is placed in a 500 ml. 3-necked glass reaction flask equipped with a dropping funnel, a stirrer, and a condenser placed so that condensed vapors are returned to the flask. The flask is filled with nitrogen and is maintained in an atmosphere of nitrogen throughout the run. One hundred milliliters of dry dioxane is introduced into the flask, the mixture is stirred and a solution of 3.80 g. of decaborane (0.031 mole) in 100 ml. of dry dioxane is added dropwise to the reaction mixture. A yellow solid forms and this is accompanied by the evolution of hydrogen. The flask is heated to the boiling point of the dioxane (100° C.) and the reaction mixture is refluxed for a total of 16 hours at the end of which time evolution of hydrogen has completely stopped. The reaction mixture is cooled and filtered in a stream of nitrogen. The yellow solid precipitate is vacuum-dried at 40° C. and ca. 1 mm. of mercury. There is obtained 7.36 (78% of theory) of $NaB_{11}H_{14} \cdot 2.5C_4H_8O_2$, a compound which can be termed sodium tetradecahydroundecaborate(1−) having 2.5 molecules of dioxane of crystallization.

*Analysis.*—Calc'd for $NaB_{11}H_{14} \cdot 2.5C_4H_8O_2$ (percent): Na, 6.11; B, 31.62; C, 31.91; H, 9.11. Found: Na, 6.6; B, 31.06; C, 31.36; H, 9.10.

Infrared analysis confirms the presence of dioxane in the product, dioxane absorption bands at 7.7, 7.9, 8.9, 9.25, 9.5, 11.1, 11.25, 11.3 and 11.4 microns being present. The infrared spectrum also shows a sharp peak at 3.95 microns which is assigned to the B-H function.

This sodium salt is extremely hygroscopic. It is soluble in diethyl ether and in acetone at room temperature (20–30° C.), and is insoluble in hydrocarbons, e.g., pentane, hexane, and petroleum ether. When an ether solution of this salt is added to an alcoholic solution of silver nitrate, a precipitate of metallic silver forms immediately. This sodium salt of the $B_{11}H_{14}^-$ anion explodes when it is brought in contact with concentrated nitric acid. This salt decomposes slowly in water, e.g., in 24 hours at room temperature.

Acetone solutions of $NaB_{11}H_{14} \cdot 2.5C_4H_8O_2$ are stable at room temperature; however, at moderately elevated temperatures this salt reduces acetone to isopropyl alcohol. For example, a solution of $NaB_{11}H_{14} \cdot 2.5C_4H_8O_2$ in acetone is heated in a sealed glass tube at 55° C. for 64 hours, and the reaction mixture is then hydrolyzed with water. By gas chromatographic and mass spectrometric analyses of the volatile products obtained, it is shown that the acetone is reduced to isopropyl alcohol.

(B) Preparation of dioxane-free $NaB_{11}H_{14}$.—A sample of the $NaB_{11}H_{14} \cdot 2.5C_4H_8O_2$ of part (A) of this example is dissolved in about ten times its weight of water and the resulting solution is evaporated under reduced pressure at slightly above room temperature to about 1/10 its original volume. During the evaporation the dioxane is removed and the residue is an aqueous solution of $NaB_{11}H_{14}$. Infrared absorption analysis of this aqueous solution shows none of the absorption bands of dioxane at 7.7, 7.9, 8.9, 9.25, 9.5, 11.1, 11.25, 11.3, and 11.4 microns but still shows the sharp peak at 4.0 microns due to B-H and a wide absorption band at 9.7 microns characteristic of the $B_{11}H_{14}^-$ anion. The spectrum also shows water absorption bands at 2.7 and 6.2 microns. The complete infrared absorption spectrum of this aqueous solution of $NaB_{11}H_{14}$ is shown in FIG. 1. In this spectrum the absorption peaks at 3.5, 6.9, and 13.9 microns are produced by the polyethylene bags which were used as containers for the aqueous $NaB_{11}H_{14}$ solutions.

(C) Preparation of $NaB_{11}H_{14}$ from $NaB_{10}H_{13}$.—A solution of 9.2 millimoles of $NaB_{10}H_{13}$, prepared as described in U.S. Pat. 2,993,751 or by Hawthorne et al., J. Am. Chem. Soc. 82, 1825 (1960), in 12 ml. of diethylene glycol dimethyl ether (diglyme) in a vacuum train reaction flask is stirred with 14.5 millimoles of diborane at 45° C. for 2.5 hours, and at room temperature (25° C.) overnight. Careful fractionation of the reaction mixtures gives 6.5 millimoles of unchanged diborane and much hydrogen. The solvent is removed under reduced pressure and there is obtained a yellow solid residue which is an etherate of $NaB_{11}H_{14}$. This solid is dissolved in water and to the resulting solution is added aqueous tetramethylammonium chloride which gives a precipitate of $(CH_3)_4NB_{11}H_{14}$. This precipitate is recrystallized from water in the form of pure white crystals. This product is shown to be identical to the product of Example 3 below by its infrared absorption spectrum.

Example 2

Preparation of $LiB_{11}H_{14} \cdot 2C_4H_8O_2$.—A 100 ml. stainless steel reaction vessel is charged with 1.78 g. of decaborane (0.0145 mole) and 0.32 g. of lithium borohydride (0.0145 mole). The reactor is cooled by a bath of a mixture of solid carbon dioxide and acetone and is then evacuated. Thirty milliliters of freshly distilled 1,2-dimethoxyethane (glyme) is introduced into the reactor after which it is closed and heated for 10 hours at 90° C. The reactor is connected to a vacuum train, opened and the uncondensable gases collected and measured, 0.0270 mole of gas being obtained (93% of theory). Mass spectrometric analysis shows that the gas is 98.2% hydrogen, about 0.7% nitrogen and/or carbon monoxide, and about 0.5% methane. The reaction vessel is opened and its contents filtered. To the yellow filtrate is added 200 ml. of dry dioxane and a yellow precipitate forms immediately. This precipitate is dried in a current of nitrogen at 25° C. There is obtained 3.41 g. (73% of theory) of yellow solid $LiB_{11}H_{14} \cdot 2C_4H_8O_2$, a compound which can be termed lithium tetradecahydroundecaborate(1-) having two molecules of dioxane of crystallization. A sample of this material is purified by extraction with dioxane in a Soxhlet extractor. The dioxane-insoluble portion is analyzed.

Analysis.—Calc'd for $LiB_{11}H_{14} \cdot 2C_4H_8O_2$ (percent): Li, 2.19; B, 37.63; C, 30.38; H, 9.86. Found (percent): Li, 2.0; B, 38.33; C, 30.10; H, 9.36.

The infrared absorption spectrum obtained on this compound is very similar to that obtained on the sodium salt of Example 1. The spectrum shows the presence of dioxane and the characteristic 3.95 micron band of the B-H function.

The lithium salt of the $B_{11}H_{14}^-$ anion is extremely hygroscopic. It is soluble in diethyl ether and in 1,2-dimethoxyethane and is insoluble in hydrocarbons (pentane, hexane, and petroleum ether). An ether solution of this salt reduces alcoholic silver nitrate to elemental silver. The salt is ignited by contact with nitric acid.

Example 3

Preparation of $(CH_3)_4NB_{11}H_{14}$.—The dioxanate of $NaB_{11}H_{14}$ (the product of Example 1) is dissolved in water and an aqueous solution of tetramethylammonium chloride is added to it. A yellow precipitate forms immediately. The yellow precipitate is filtered from the reaction mixture and dried at 40° C., ca. 1 mm. mercury. Infrared analysis of this product indicates that it does not contain any water or dioxane of solvation. The infrared absorption spectrum shows the charactertistic B-H absorption at 3.95 microns and the tetramethylammonium, $(CH_3)_4N^+$, absorption at 10.5 microns. This compound can be named tetramethylammonium tetradecahydroundecaborate(1-).

Analysis.—Calc'd for $C_4H_{26}NB_{11}$ (percent): C, 23.18; H, 12.64. Found (percent): C, 23.13; H, 10.70.

Example 4

Preparation of $CsB_{11}H_{14}$.—The addition of an aqueous solution of cesium chloride to an aqueous solution of $NaB_{11}H_{14} \cdot 2.5C_4H_8O_2$ (the product of Example 1) gives a bright yellow precipitate. This precipitate is filtered from the reaction mixture, dried at 25° C. and ca. 1 mm. mercury and the product is analyzed by infrared spectroscopy. The infrared absorption spectrum contains a band at 4.05 microns assigned to the B-H function. The spectrum shows no indication of the presence of water or of dioxane. This product can be termed cesium tetradecahydroundecaborate(1-).

Analysis.—Calc'd for $CsB_{11}H_{14}$ (percent): B, 44.7; H, 5.3; Cs, 50.0. Found (percent): B, 44.4; H, 5.4; Cs, 50.4.

By single crystal X-ray analysis, a unit cell of the crystal of $CsB_{11}H_{14}$ is found to have the following dimensions: $a = 7.35$ A., $b = 11.38$ A., $c = 12.85$ A. There are four formula weights per unit cell. The density of the crystals is found to be 1.66. Thus, the experimental formula weight is 265 which is in good agreement with 266 required for $CsB_{11}H_{14}$.

Example 5

Preparation of $(CH_3)_3SB_{11}H_{14}$.—To an aqueous solution of $NaB_{11}H_{14}$, prepared as described in Example 1(B), is added an aqueous solution of trimethylsulfonium iodide, $(CH_3)_3SI$. A yellow precipitate forms, which is filtered from the reaction mixture, dried and then recrystallized from water. The carefully recrystallized salt, which is $(CH_3)_3SB_{11}H_{14}$, is colorless. The infrared absorption spectrum obtained on this salt shows a sharp B-H peak at 4.0 microns, and $(CH_3)_3S^+$ and $B_{11}H_{14}^-$ peaks coincident at 9.6 microns.

Another sample of $(CH_3)_3SB_{11}H_{14}$ is subjected to elemental analysis with the following results:

Analysis.—Calc'd for $(CH_3)_3SB_{11}H_{14}$ (percent): B, 56.6; C, 17.2; H, 11.0; S, 15.3. Found (percent): B, 53.8; C, 17.6; H, 11.2; S, 15.5.

Example 6

Preparation of $(C_2H_5)_3NHB_{11}H_{14}$.—To an aqueous solution of $NaB_{11}H_{14} \cdot 2.5$dioxanate is added an aqueous solution of triethylammonium chloride, $(C_2H_5)_3NHCl$. The yellow precipitate that forms is filtered from the reaction mixture and dried. The dried salt, which is $(C_2H_5)_3NHB_{11}H_{14}$, is recrystallized from water and the resulting crystals are colorless. The infrared absorption spectrum of the recrystallized product shows B-H absorption at 4.0 microns; N-H absorption at 3.15 microns, and $B_{11}H_{14}^-$ and $(C_2H_5)_3NH^+$ absorption coincident at 9.7 microns.

Analysis.—Calc'd for $(C_2H_5)_3NHB_{11}H_{14}$ (percent): B, 50.6; C, 30.7; H, 12.9; N, 6.0. M.W., 234. Found (percent): B, 49.7; C, 31.4; H, 13.5; N, 6.0. M.W., 231 (by boiling point elevation of $ClCH_2CH_2Cl$).

Figure 2:
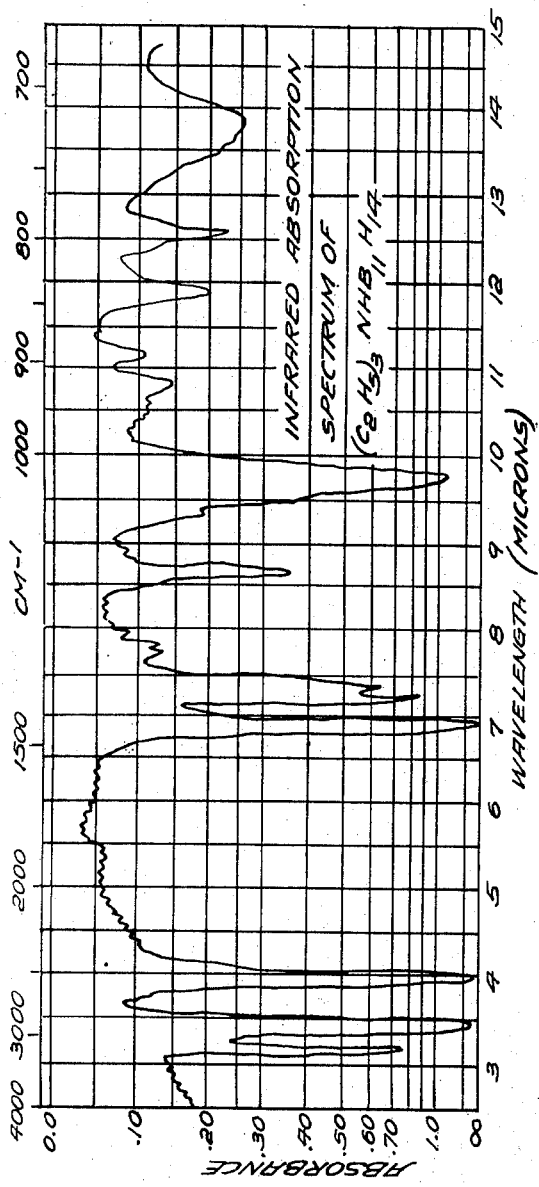
Figure 3:
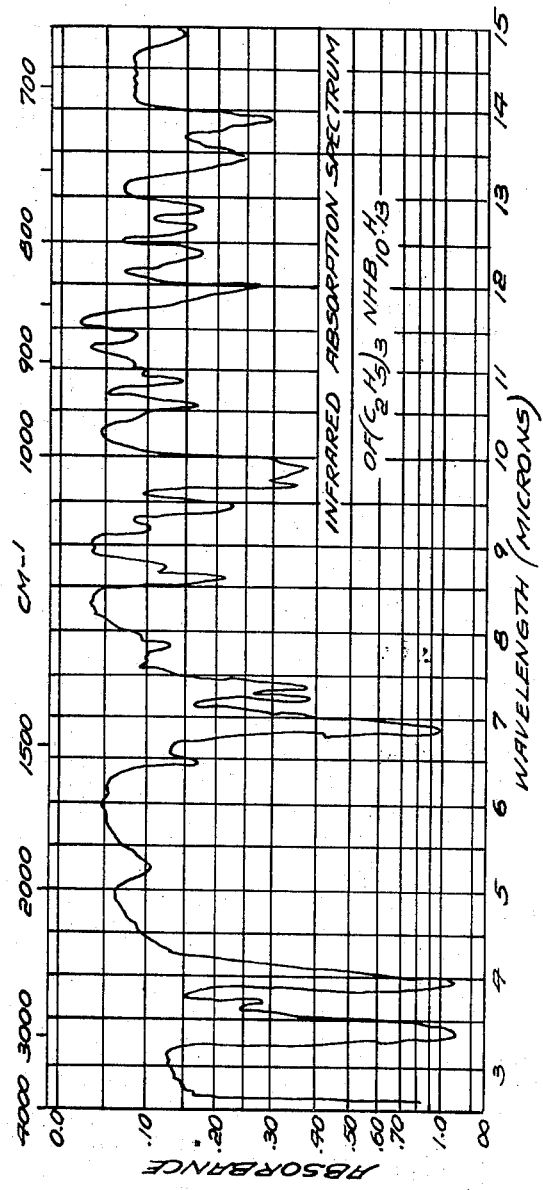

The complete infrared absorption spectrum of a sample of $(C_2H_5)_3NHB_{11}H_{14}$ recrystallized from a mixture of $CHCl_3$ and $CH_2Cl_2$, in a "Nujol" mull is shown in FIG. 2. In this spectrum the absorption peaks at 3.45, 6.9, and 7.3 microns are due to the "Nujol." There are significant differences in the absorption spectrum given by $(C_2H_5)_3NHB_{11}H_{14}$ compared to the infrared absorption spectrum of $(C_2H_5)_3NHB_{10}H_{13}$ which is shown in FIG. 3. The salt used for FIG. 3 was prepared by the method of Hawthorne et al., J. Am. Chem. Soc., 82, 1825 (1960) by addition of triethylamine to a benzene solution of decaborane. The $(C_2H_5)_3NHB_{10}H_{13}$ used for infrared analysis was a sample recrystallized from chloroform and the infrared determination was made in "Nujol" mull. As in the case in FIG. 2, the absorption peaks in FIG. 3 at 3.4, 6.85, and 7.3 microns are due to the "Nujol." Comparison of FIGS. 2 and 3 shows significant differences in the absorption spectrum for the $B_{11}H_{14}^-$ salt in comparison with that of the $B_{10}H_{13}^-$ salt. In particular, significant absorption peaks of the $B_{10}H_{13}^-$ salt which are completely absent from the $B_{11}H_{14}^-$ spectrum occur at 4.05, 5.2, 6.4, 6.75, 8.55, 9.25, 9.9, 10.6, 10.9, 11.4, 11.95, 12.3, 12.9, 13.4 microns. These absorption peaks are not present in the spectrum for the $B_{11}H_{14}^-$ salt which is shown in FIG. 2.

The $B^{11}$ magnetic resonance of $(C_2H_5)_3NHB_{11}H_{14}$ is shown in FIG. 4. The $B_{11}$ magnetic resonance is a sharp symmetrical doublet of about 140 c.p.s. separation displaced about 34 p.p.m. up-field from the boron resonance frequency of trimethyl borate. This magnetic resonance spectrum of the $B_{11}H_{14}^-$ salt is markedly different from the $B^{11}$ magnetic resonance spectrum of

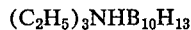

$(C_2H_5)_3NHB_{10}H_{13}$ shown in FIG. 5. The $B^{11}$ magnetic resonance of the $B_{10}H_{13}^-$ salt is more complex. There is a broad unsymmetrical doublet of about 128 c.p.s. separation at +21.5 p.p.m. from the boron resonance frequency of trimethyl borate and a weaker but symmetrical and sharp doublet of 129 c.p.s. separation at +52 p.p.m. from trimethyl borate. Both of these nuclear magnetic resonance spectra are determined at 14.3 mc. on solutions of the polyhydropolyborate salts in methylene chloride.

Pure $(C_2H_5)_3NHB_{11}H_{14}$ in methylene chloride solution exhibits no absorption maximum in ultraviolet light. In contrast to this, the $(C_2H_5)_3NHB_{10}H_{13}$ salts of Hawthorne et al., J. Am. Chem. Soc., 82, 1825 (1960) show absorption maxima at 267 millimicrons ($\epsilon=2500$) and at 335 millimicrons ($\epsilon=1730$).

Example 7

Preparation of $KB_{11}H_{14}$.—An aqueous solution of one equivalent of potassium hydroxide is added to an aqueous solution of $(C_2H_5)_3NHB_{11}H_{14}$ (prepared as in Example 6) and the resulting solution is evaporated to dryness. The solid residue obtained is $KB_{11}H_{14}$. The infrared absorption spectrum of this salt shows absorption due to B-H at 4.0 microns and absorption due to $B_{11}H_{14}^-$ at 9.65 microns.

*Analysis.*—Calc'd for $KB_{11}H_{14}$ (percent): B, 69.2; H, 8.2; K, 22.6. Found (percent): B, 67.2; H, 8.1; K, 21.7.

Example 8

Preparation of $RbB_{11}H_{14}$.—An aqueous solution of one equivalent of rubidium chloride is added to an aqueous solution of $NaB_{11}H_{14}$, prepared as described in Example 1(B). A yellow precipitate is formed and this is filtered from the reaction mixture. After recrystallizing from water, the $RbB_{11}H_{14}$ is colorless. The infrared absorption spectrum exhibited by this rubidium salt shows B-H absorption 4.0 microns, and $B_{11}H_{14}^-$ at 9.55 and 9.85 microns.

*Analysis.*—Calc'd for $RbB_{11}H_{14}$ (percent): B, 54.4; H, 6.5; Rb, 39.1. Found (percent): B, 52.8; H, 6.6; Rb, 36.3.

Example 9

Preparation of $(CH_3)_3NHB_{11}H_{14}$.—An aqueous solution of one equivalent of trimethylammonium chloride, $(CH_3)_3NHCl$, is added to an aqueous solution of $NaB_{11}H_{14}$, prepared as described in Example 1(B). A yellow precipitate of $(CH_3)_3NHB_{11}H_{14}$ forms and this is removed from the reaction mixture by filtration. On recrystallization of the yellow precipitate from water a colorless precipitate of $(CH_3)_3NHB_{11}H_{14}$ is obtained. The infrared absorption spectrum obtained on this recrystallized product shows B-H absorption at 4.0 microns, $B_{11}H_{14}^-$ at 9.7 at 9.7 and 9.9 microns, N-H absorption at 3.15 microns, and $(CH_3)_3NH^+$ at 10.3 microns.

*Analysis.*—Calc'd for $(CH_3)_3NHB_{11}H_{14}$ (percent): B, 61.7; C, 18.6; H, 12.5; N, 7.2. Found (percent): B, 61.6; C, 16.8; H, 12.6; N, 7.5.

The examples have illustrated the formation of certain specific salts of the $B_{11}H_{14}^-$ anion. However, the products of this invention include any salt of the $B_{11}H_{14}^-$ anion with any metal having an oxidation potential of at least 0.5 volt and an atmoic number less than 57, ammonium, sulfonium or phosphonium cation. Thus, when the procedure of Examples 1 and 2 are repeated with the sodium and lithium borohydrides of those examples replaced by potassium, rubidium, cesium, beryllium, magnesium, calcium, strontium and barium borohydrides, the corresponding potassium, rubidium, cesium, beryllium, magnesium, calcium, strontium and barium salts of the $B_{11}H_{14}^-$ anion are produced. These salts are isolated as the etherates of the particular ethers employed as reaction medium in their preparation, or as the dioxanates (which are formed by the procedure described in Example 2).

When the cesium chloride of Example 4 is replaced by any other water-soluble non-oxidizing salt of cesium, e.g., a bromide, iodide or acetate, and the procedure for Example 4 is repeated, the cesium salt of the $B_{11}H_{14}^-$ anion is obtained.

Likewise, when the tetramethylammonium chloride of Examples 1(C) and 3, the triethylammonium chloride of Example 6, the trimethylammonium chloride of Example 9, and the trimethylsulfonium iodide of Example 5 are replaced by di-, tri-, or tetraalkylammonium halide, a trialkylsulfonium halide or a tetraalkylphosphonium halide and the procedures of those examples followed the corresponding substituted ammonium, sulfonium and phosphonium salts of $B_{11}H_{14}^-$ are obtained. For example, specific ammonium salts obtained in this way include diethylammonium, tri-n-propylammonium, tetraisobutylammonium, dioctylammonium, tetradecylammonium, and monooctadecylammonium salts of the $B_{11}H_{14}^-$ anion. Furthermore, other specific sulfonium salts that are obtained include triethyl-, triisopropyl-, trihexyl-, and tridecylsulfonium salts of the $B_{11}H_{14}^-$ anion. Soecific phosphonium salts of the $B_{11}H_{14}^-$ anion obtained in the above mentioned manner include tetramethylphosphonium, tetraethylphosphonium, and tetraoctylphosphonium salts of the $B_{11}H_{14}^-$ anion.

Finally, specific water-soluble salts of the $B_{11}H_{14}^-$ anion that can be prepared by the metathetical reaction described hereinbefore include the aluminum, chromium, zinc, manganese and zirconium salts of $B_{11}H_{14}^-$.

The salts of this invention are useful in various applications. Thus, the ethereal or aqueous solutions of these salts are useful reducing agents. For example, such solutions reduce silver or nickel salts to the free metals.

The salts are also stable towards alkali, consequently making them useful as reducing agents in alkaline systems.

Furthermore, the salts of this invention are useful as components as high energy fuels. These salts are ignited by treatment with concentrated nitric acid and the compounds burn rapidly.

The compounds of this invention are generically useful as components of fireworks compositions to impart a pleasing color and sparkle to the display. Every one of the compounds of the invention contains an anion which has boron as a common component. The presence of this element imparts a green color to a fireworks, rocket or flare display. The compounds of this invention can have a wide range of metal cations and it is thus possible to provide a broad range of colors in any display or flare by appropriate choice of cation. The compounds of the invention can be used in combination with oxidizing agents, e.g., lithium perchlorate, sodium nitrate, potassium permanganate, strontium peroxide, manganese dioxide, and the like to provide the desired propulsion effect and color.

The salts of the $B_{11}H_{14}^-$ anion are useful as a source of hydrogen. The hydrogen of this anion is liberated quantitatively on hydrolysis in the presnece of a catalyst such as platinum black. The complete hydrolysis of the $B_{11}H_{14}^-$ salts can be effected in aqueous hydrochloric acid in the presence of platinum black. The final supernatent liquid obtained in such hydrolysis systems is non-reducing toward silver nitrate, showing that hydrolysis is complete. In a typical experiment, 0.8023 g. of $(C_2H_5)_3NHB_{11}H_{14}$ in a platinum weighing dish is placed in a sidearm of a reaction vessel containing 0.1 g. of platinum black and 20 milliliters of 4 N aqueous hydrochloric acid which is then cooled to $-196°$ C. and the reaction vessel is evacuated to less than 1 micron. The aqueous acid is then allowed to melt and the sample is dislodged into the acid. Hydrogen evolution is qrapid at room temperature. The volume of the system is such that on complete hydrolysis the total pressure approaches but does not exceed 760 millimeters. The reaction mixture is heated to reflux until the pressure remains unchanged over a period of 15 to 30 minutes. The hydrolysis mixture is cooled to $-196°$ C. and the gas which has been generated is passed through a liquid nitrogen and transferred to a known volume with a Töpler pump. Triplicate experiments give 2305.5, 2301.5 and 2297.3 (average 2301.4) cc. of hydrogen per gram of triethylammonium tetradecahydroundecaborate. This is within 0.75% of the 2284.4 cc./g. required for $(C_2H_5)_3NHB_{11}H_{14}$ calculated in accordance with the following equation:

$$B_{11}H_{14}^- + 32H_2O \rightarrow BO_2^- + 10H_3BO_3 + 24H_2$$

The quantitative measurement of the hydrogen evolved on complete hydrolysis of purified $B_{11}H_{14}^-$ salts confirms the $B_{11}H_{14}^-$ formulation. In contrast, complete hydrolysis of $B_{10}H_{13}^-$ salts would proceed in accordance with the following equation:

$$B_{10}H_{13}^- + 29H_2O \rightarrow BO_2^- + 9H_3BO_3 + 22H_2$$

Thus, the theoretical quantity of hydrogen that would be evolved from one gram of $(C_2H_5)_3NHB_{10}H_{13}$ is 2210 cc.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula $$M(B_{11}H_{14})_n$$

wherein M is a cation having a valence of 1–4 selected from the group consisting of metals having a standard oxidation potential of at least 0.5 volt and an atomic number less than 57 selected from the group consisting of lithium, sodium, potassium, rubidium, cesium, beryllium, magnesium, calcium, strontium, barium, aluminum, scandium, titanium, vanadium, chromium, manganese, zinc, gallium, yttrium, zirconium and niobium, and $n$, the valence of the radical M, is an integer greater than 0 and less than 5.

2. An aqueous solution of $NaB_{11}H_{14}$.
3. An aqueous solution of $KB_{11}H_{14}$.
4. A solid hydrate of $NaB_{11}H_{14}$.
5. $CsB_{11}H_{14}$.

References Cited

UNITED STATES PATENTS 3,328,134   6/1967   Miller et al. _____ 23—358

OTHER REFERENCES

Aftandilian et al.: "Inorganic Chemistry," vol. 1, pp. 734–737 (November 1962).

MILTON WEISSMAN, Primary Examiner

U.S. Cl. X.R.

260—567.6, 606.5, 563

PO-1050
(5/69)

UNITED STATES PATENT OFFICE
CERTIFICATE OF CORRECTION

Patent No. 3,772,426      Dated November 13, 1973

Inventor(s) Victor D. Aftandilian

It is certified that error appears in the above-identified patent and that said Letters Patent are hereby corrected as shown below:

Col. 7, line 36 - "$Bl^{1}$" should be "$B^{11}$".

Col. 9, line 28 - correct spelling of "rapid".

Rewrite the claims as follows:

[1. A compound of the formula ... 0 and less than 5.]

1. [2.] An aqueous solution of $NaB_{11}H_{14}$.

2. [3.] An aqueous solution of $KB_{11}H_{14}$.

3. [4.] A solid hydrate of $NaB_{11}H_{14}$.

4. [5.] $CsB_{11}H_{14}$.

Signed and sealed this 16th day of April 1974.

(SEAL)
Attest:

EDWARD M.FLETCHER,JR.
Attesting Officer

C. MARSHALL DANN
Commissioner of Patents